(12) United States Patent
Erite et al.

(10) Patent No.: US 6,195,339 B1
(45) Date of Patent: Feb. 27, 2001

(54) METHOD AND APPARATUS FOR LOCAL PROVISIONING OF TELECOMMUNICATIONS NETWORK INTERFACE UNIT

(75) Inventors: Carl Erite, Glen Ellyn, IL (US); Rick Young, Corinth, TX (US)

(73) Assignee: HyperEdge Corp., Batavia, IL (US)

( * ) Notice: Subject to any disclaimer, the term of this patent is extended or adjusted under 35 U.S.C. 154(b) by 0 days.

(21) Appl. No.: 08/996,547

(22) Filed: Dec. 23, 1997

(51) Int. Cl.[7] .............................. H04J 15/00; H04L 12/28
(52) U.S. Cl. ......................... 370/254; 370/254; 700/12; 700/15; 700/27
(58) Field of Search ................................ 370/463, 254; 700/12, 15, 27

(56) References Cited

U.S. PATENT DOCUMENTS

| | | |
|---|---|---|
| 4,562,311 | 12/1985 | Dola . |
| 5,226,120 * | 7/1993 | Brown et al. ................. 709/224 |
| 5,444,776 | 8/1995 | Sheets et al. . |
| 5,497,373 | 3/1996 | Hulen et al. . |
| 5,577,115 | 11/1996 | Deutsch et al. . |

OTHER PUBLICATIONS

Teltrend Technical Publication "DS1 Digital Network Interface Connector Model DNI5702 (Issue 4)" dated Jun. 1996.
Westell General Description "3110–04G T1 Facility Loopback Unit with Inband or ESF Operation" dated Jun. 1994.
Teltrend Technical Publication "Digital Data Interface Model DDI5730 (Issue 2)" dated Jun. 1992.
Wescom Equipment Issue 2 "Wescom 3551–00 T1 Network Interface Unit (NIU)" dated Nov. 1990.

* cited by examiner

*Primary Examiner*—Chi H. Pham
*Assistant Examiner*—Brenda H. Pham
(74) *Attorney, Agent, or Firm*—Patula & Associates

(57) ABSTRACT

A method and apparatus for local provisioning of a network interface unit. The local provisioning is performed by depressing a pushbutton on the front panel for an extended set determined time, at which time the NIU enters into the local provisioning mode. During this mode, a plurality of LEDs, corresponding to specific provision options, are sequentially lit. When the desired LED provision option is lit, the button is pressed to achieve the desired provisioning. The local provisioning mode is automatically exited after scrolling through all the LEDs.

15 Claims, 3 Drawing Sheets

FIGURES 3a - 3j
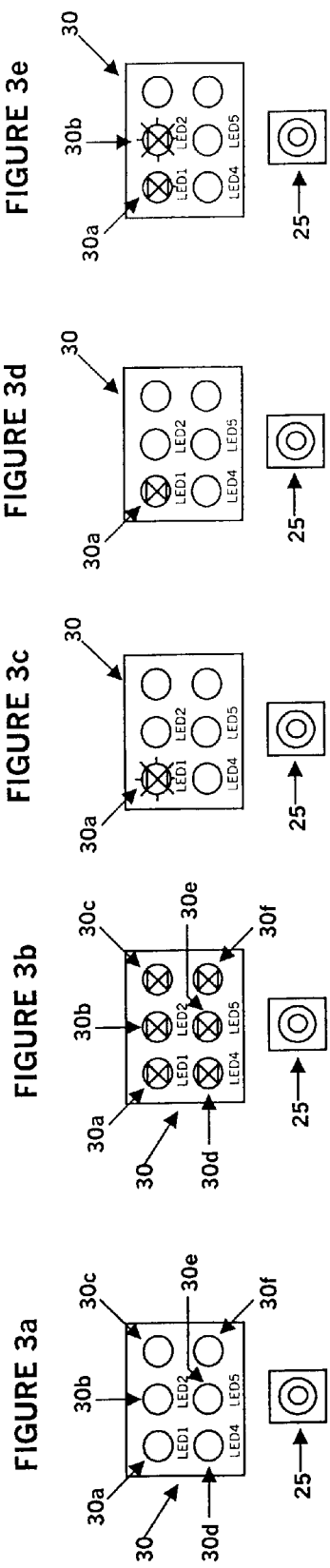
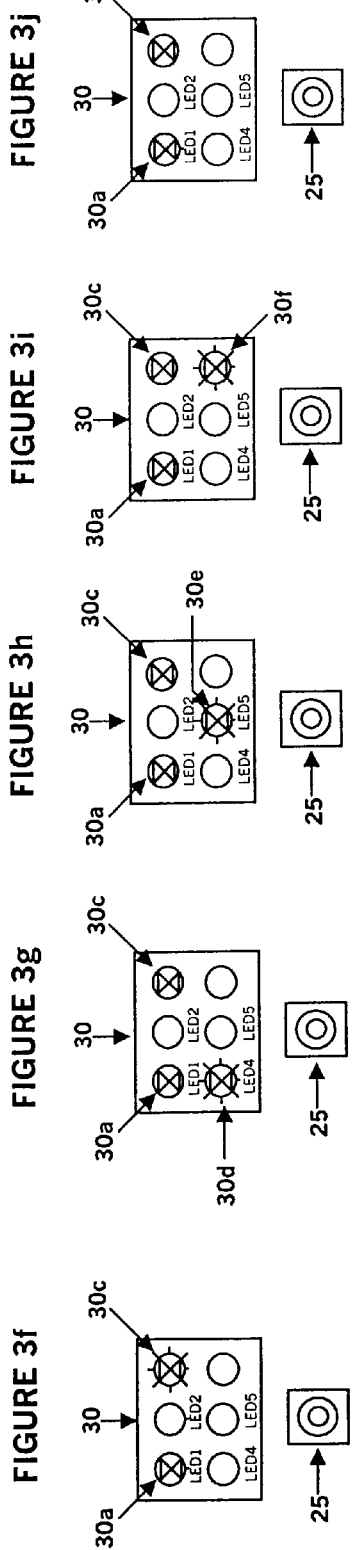

METHOD AND APPARATUS FOR LOCAL PROVISIONING OF TELECOMMUNICATIONS NETWORK INTERFACE UNIT

The present invention relates to a telecommunications network interface unit (NIU) and, in particular, to a method and device for local provisioning of a network interface unit, specifically a network interface unit capable of being provisioned via a single front panel pushbutton and associated LEDs.

BACKGROUND OF THE INVENTION

Network interface units are telecommunication transmission equipment that a network service provider, such as a telephone operating company or long distance carrier, places between their lines and the customer's lines. The network interface units provide a demarcation point for legal tariff issues.

Network interface units can be provisioned, i.e., specifically set (enabled and disabled) to perform one or more desired options such as the following functions:

(1) Line Buildout Pads
(2) Regenerator Towards Customer
(3) All One's Signal (AIS) Upon Customer Loss of Signal
(4) Loopback (LPBK) Upon Customer Loss of Signal
(5) Customer Disconnect Indicator (CDI) Upon Customer Loss of Signal Loopback
(6) NIU/Extension Repealer
(7) Others Traditional provisioning of these above options involves physically enabling and disabling various switches (slide, rotary, pushbutton, etc.) or entering commands using a computer through a RS-232 front panel connector provided on an NIU.

However, these known methods of provisioning a NIU have various disadvantages. The manual switches are typically located on the network interface units printed circuit board. As such, the NIU must be removed from its housing to determine how the NIU is provisioned and to access the switches. Further, the manual switches allow for an increased chance of being set wrong due to human error. Computerized provisioning has the disadvantage in that it can be time consuming, cost prohibitive, and further cannot be performed manually, i.e., without the proper computer, cables, etc.

Some prior art NIUs include, in addition to a number of switches, front panel pushbuttons to achieve for example, the function of manual loopback. When the button is pushed, an LED lights to signal that the loopback function is enabled. When the button is pushed again, the loopback function is disabled and the LED is turned off. However, while the manual loopback function can be enabled and disabled via the button, provisioning of the NIU for the other various functions must be achieved by the use of the above-identified provisioning methods.

The present invention, however, solves the problems and disadvantages of the prior art network interface units and provisioning methods. The present invention provides for a cost-effecetive, time saving, user friendly method and device to locally provision and determine the provisions of a network interface unit without removing the unit from its mounting or using a computer or requiring additional pushbutton switches.

BRIEF SUMMARY OF THE INVENTION

The present invention is a method and device for the local provisioning of a telecommunication network interface unit (NIU) shown in the attached drawings. Prior art NIUs typically must be provisioned by manipulating a number of switches (not shown) on the body of the NIU into a set sequence as desired to perform a particular function. However, in order to do so, the NIU must be removed from its housing to gain access to the switches. The present invention provides for local provisioning via a single pushbutton located on the front panel of the NIU. Preferably, the existing manual loopback button (MLB) is utilized in a dual purpose manner to achieve the objective of the present invention. To provision the NIU of the present invention, the MLB is depressed and held for a predetermined amount of time. As a result, the LED indicators illuminate and then begin to scroll from one to another at a timed sequence, each representing a distinctly set provision. When the desired LED corresponding to the desired provision is scrolled to and flashes, the user pushes the MLB to set that provision. Then, the LED indicators continue to scroll and flash sequentially until reaching the last LED, at which time the provisioning mode automatically ends. During the scrolling, any number of provisions can be selected. Accordingly, the NIU can readily be provisioned, via a single, front panel pushbutton, specifically the MLB, without needing to remove the NIU or manipulating multiple pushbuttons.

Accordingly, it is the principle object of the present invention to provide a method and device for the local provisioning of a telecommunications network interface unit.

It is a further object of the present invention to provide a method and device for pushbutton provisioning of a network interface unit.

It is another object of the present invention to provide a user friendly, cost-effective, power consumption efficient and time efficient method and device for the local provisioning of a network interface unit.

It is also an object of the invention to provide a single, manual, front panel pushbutton used in connection with a plurality of LEDs corresponding to specific provisions to achieve local provisioning of a network interface unit.

It is an additional object of the present invention to utilize the MLB to achieve local provisioning of a network interface unit.

It is yet another object of the invention to provide for the automatic scrolling of LED provision indicators and the automatic exit from provisioning mode on a network interface unit.

Numerous other advantages and features of the invention will become readily apparent from the detailed description of the preferred embodiment of the invention, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

FIGS. 3a–3j illustrate the sequential steps utilized to achieve local provisioning according to the present invention.

DETAILED DESCRIPTION OF THE PREFERRED EMBODIMENT OF THE PRESENT INVENTION

Figure 2:
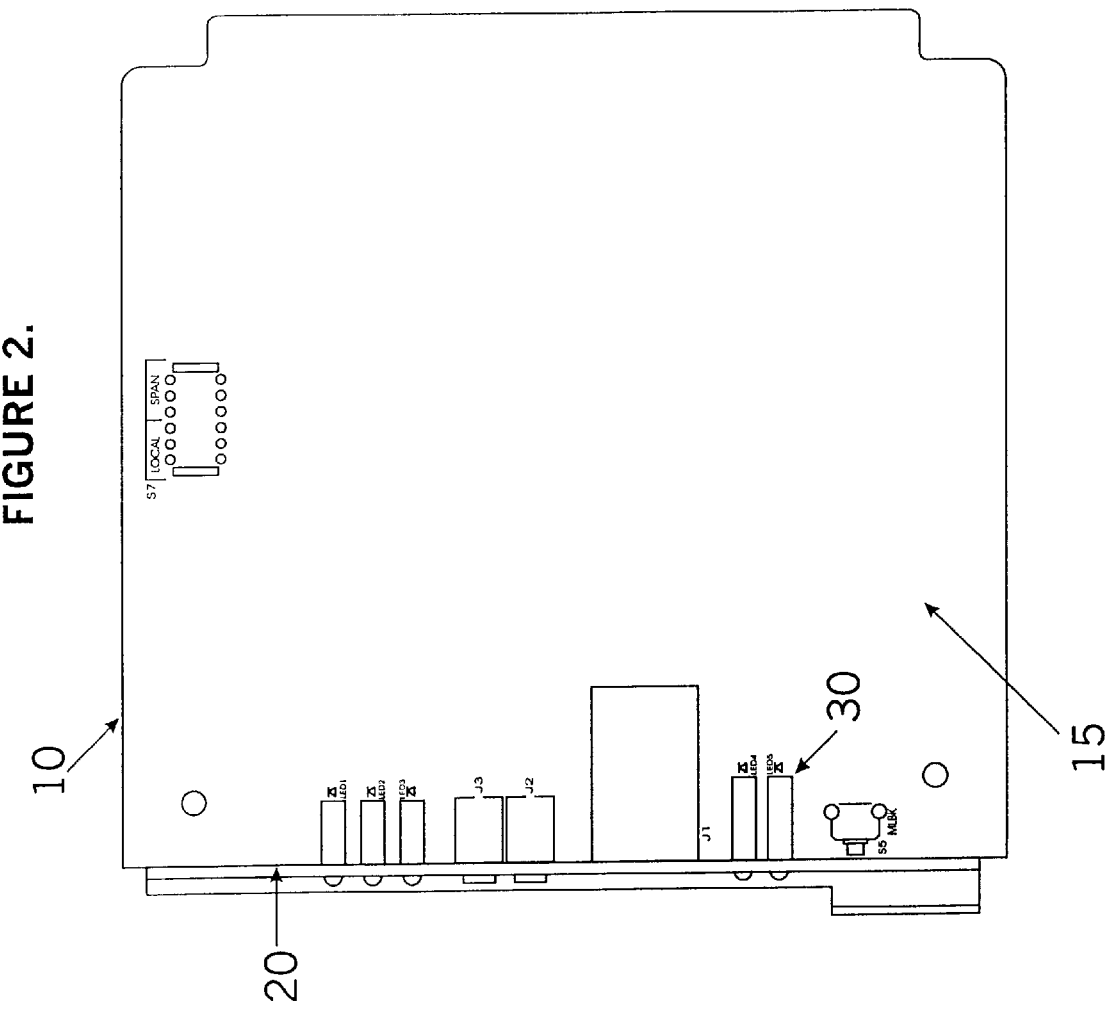
FIG. 2 is a side view of the network interface unit of FIG. 1.

While the invention is susceptible of embodiment in many different forms, there is shown in the drawings and will be described herein in detail a preferred embodiment of the present invention. It should be understood, however, that the present disclosure is to be considered an exemplification of the principles of the invention and is not intended to limit the spirit and scope of the invention and/or claims of the embodiment illustrated.

Figure 1:
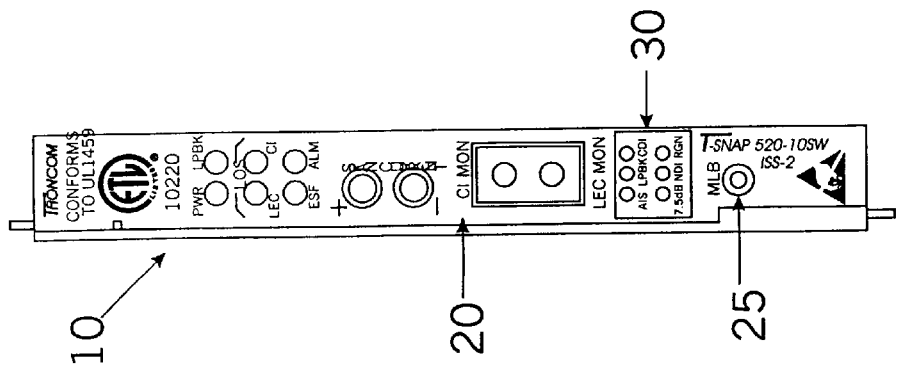
FIG. 1 is a front view of the network interface unit of the present invention.

FIGS. 1 and 2 illustrate generally the network interface unit 10 of the present invention. As can be seen, the NIU 10 comprises a printed circuit board 15 and a front panel 20. The front panel 20 includes a plurality of indicators for monitoring the status of the NIU. Specifically, in accordance with the present invention, the front panel 20 includes a manual loopback pushbutton 25 and local provisioning LED indicators 30.

The novel manual loopback button 25 of the present invention serves a dual function. One function of the button 25 is to enable and disable the loopback function as is known in the prior art. The other function of the button 25 is to allow for the advantageous local provisioning of the NIU according to the principles of the present invention.

Accordingly, when the button 25 is pressed and released, the loopback function is enabled. When the button 25 is subsequently pressed and released, the loopback function is disabled. When the button 25 is pressed and held for a predetermined amount of time, however, local provisioning can be achieved in the following manner.

Button 25 is pressed and held for a predetermined amount of time, for example, four seconds. After the set time (e.g., four seconds), the local provisioning LED indicators 30 (six illustrated) all illuminate for a set period of time (e.g., one second), thus indicating that local provisioning mode has been entered. The MLB is then released and the LEDs 30a–30f (see FIG. 3) automatically begin to scroll or light up one at a time sequentially. When the LED corresponding to the desired provision is scrolled to, the user simply presses the button 25 to enable that provision and the program will then scroll to the next LED. This procedure can be used to select any desired provision option. After scrolling to the last LED, the local provision mode will automatically be exited after a set period of time.

By way of example, FIGS. 3a–3j illustrate the steps necessary to set the provisions corresponding to the first and third LEDs or LED 30a and LED 30c respectively.

Accordingly, FIG. 3a illustrates the first step to achieve the desired local provisioning. Initially, all LEDs 30a–30f are unlit. To enter into local provisioning mode, the user presses pushbutton 25 for a set period of time (e.g., four seconds).

After this set period of time, the second step is reached wherein all the LEDs 30a–30f illuminate for a set period of time (e.g., one second), as illustrated in FIG. 3b. At this time, the user releases the pushbutton 25.

Next, the program will begin to sequentially scroll through the LEDs, allowing the user to select the desired provisions. FIG. 3c illustrates the third step, wherein LED 30a flashes, for example, every ½ second, for a set period of time (e.g., three seconds).

To enable the provision corresponding to LED 30a, the user simply needs to press pushbutton 25 (fourth step) while LED 30a is flashing, as indicated in FIG. 3d. Once enabled, LED 30a will illuminate continuously, and LED 30b will be scrolled to.

As illustrated in FIG. 3e, LED 30b next flashes, for example, every ½ second, for a set period of time (e.g., three seconds) (fifth step). If the user desires to enable the provision corresponding to LED 30b, the user would press pushbutton 25. However, as in this example, if the user does not want to enable this option, the user will do nothing and wait for the program to scroll to LED 30c.

FIG. 3f illustrates the sixth step wherein LED 30c is scrolled to and begins to flash, for example, every ½ second, for a set period of time (e.g., three seconds). The user can enable the provision corresponding to LED 30c by pressing pushbutton 25, at which time LED 30c will illuminate continuously and the program will scroll to LED 30d.

As illustrated in FIG. 3g, LED 30d next flashes, for example, every ½ second, for a set period of time (e.g., three seconds) (seventh step). If the user desires to enable the provision corresponding to LED 30d, the user would press pushbutton 25. However, as in this example, if the user does not want to enable this option, the user will do nothing and wait for the program to scroll to LED 30e.

As illustrated in FIG. 3h, LED 30e next flashes, for example, every ½ second, for a set period of time (e.g., three seconds) (eighth step). If the user desires to enable the provision corresponding to LED 30e, the user would press pushbutton 25. However, as in this example, if the user does not want to enable this option, the user will do nothing and wait for the program to scroll to LED 30f.

As illustrated in FIG. 3i, LED 30f next flashes, for example, every ½ second, for a set period of time (e.g., three seconds) (ninth step). If the user desires to enable the provision corresponding to LED 30f, the user would press pushbutton 25. However, as in this example, if the user does not want to enable this option, the user will do nothing and wait for LED 30f to stop flashing.

Once LED 30f stops flashing, the local provisioning mode will be automatically exited (final step) and the enabled provisions (30a and 30c) will remain illuminated as illustrated in FIG. 3j. Accordingly, it should be understood that any desired provisioning of the network interface can be achieved through the principles of the present invention.

Preferably, once the local provisioning mode is entered as described in FIGS. 3a and 3b, any and all previously provisioned options will be automatically disabled. Thus, for example, if the local provisioning mode is entered into again after the final step shown in FIG. 3j, then the provision options identified by LEDs 3a and 3c will be disabled and can be enabled again as previously described. Alternatively, any and all previously enabled provision options could remain enabled upon entry of the local provisioning mode, and these provision options could be disabled by pressing button 25 when scrolled to.

Figure 4:
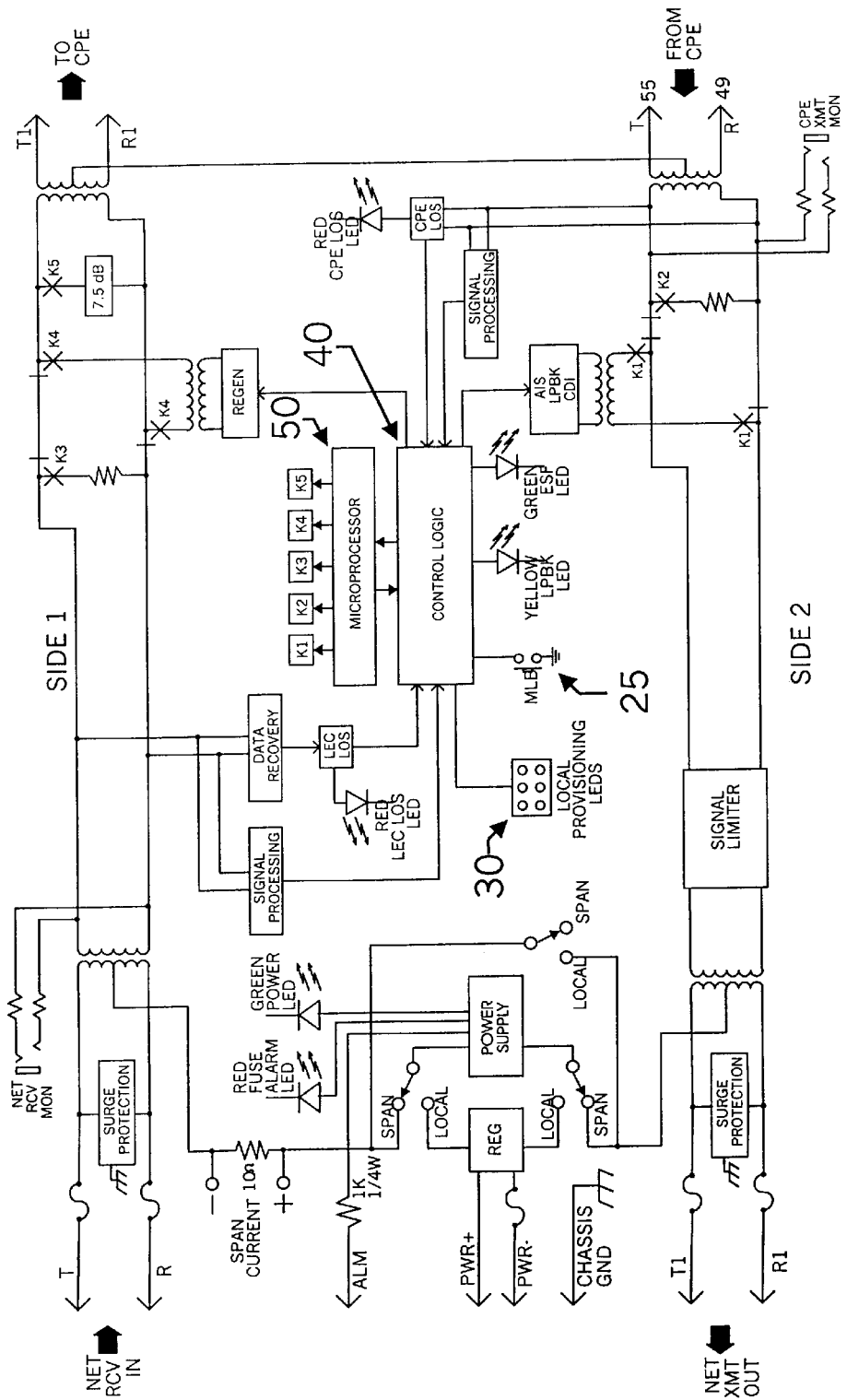
FIG. 4 is a block diagram of the network interface unit of the present invention.

FIG. 4 illustrates a block diagram of a network interface unit incorporating the novel and unobvious local provisioning features of the present invention. As can be seen, the network interface unit includes a logic control 40 operatively associated with a microprocessor 50. The manual loopback button 25 and the local provisioning LEDs are operatively connected to one of the logic control 40 or the microprocessor 50 to achieve the above described local provisioning of the present invention.

The novel and unobvious method and device for local provisioning as described above allows a user to quickly and precisely provision the NIU as desired. Such provisioning is user friendly, cost efficient and power consumption efficient.

It is to be understood that the embodiment herein described is merely illustrative of the principles of the present invention. Various modifications may be made by those skilled in the art without departing from the spirit or scope from the claims which follow. For example, local provisioning can be obtained via a single, front panel pushbutton switch and various LEDs regardless of the interactions of the pushbutton switch and the LEDs. Accordingly, it is foreseen that any number of LEDs corresponding to various provision options could be provided. Further, the pushbutton used to enter into the local provisioning mode could be provided separate from the manual loopback button.

What is claimed is:

1. A network interface unit comprising:

a circuit board;

a front panel operatively connected to said circuit board;

a pushbutton on said front panel; and a plurality of LEDs on said front panel, said plurality of LEDs each corresponding to a specific NIU provision option;

said plurality of LEDs being sequentially scrolled to upon depressing said pushbutton for a predetermined amount of time;

said specific NIU provision option being selected upon pressing said pushbutton after scrolling to a desired LED provision option.

2. The network interface unit of claim 1, wherein said pushbutton is a dual functioning, manual loopback button.

3. A method for the local provisioning of a network interface unit comprising a circuit board having a front panel, said method comprising the steps of:

providing a pushbutton on said front panel;

providing a plurality of LEDs each corresponding to a specific NIU provision option;

depressing said pushbutton for a predetermined amount of time to enter into a local provisioning mode;

sequentially scrolling through said plurality of LEDs; and enabling said specific NIU provision option upon pressing said pushbutton when a corresponding LED is scrolled to.

4. The method of claim 3, further comprising the step of automatically exiting said local provisioning mode after scrolling through said plurality of LEDs.

5. The method of claim 3, wherein said pushbutton is a dual functioning manual loopback button.

6. A system for the local provisioning of a network interface unit having a printed circuit board and a front panel including a plurality of LEDs respectively corresponding to a plurality of provisioning options, the system comprising:

a pushbutton for entering into a local provisioning mode and for selectively enabling said plurality of provisioning options while in said local provisioning mode, wherein said plurality of LEDs are automatically sequentially scrolled through while in said local provisioning mode and said plurality of provisioning options are selectively enabled by pressing said pushbutton when the LED corresponding to the desired provisioning option is scrolled to, such that provisioning of said network interface unit is achieved solely by manipulating said pushbutton.

7. The system of claim 6, wherein said local provisioning mode is automatically exited upon the system scrolling through said plurality of LEDs.

8. The system of claim 6, wherein said pushbutton is a dual function, manual loopback button.

9. A method for the local provisioning of a network interface unit having a printed circuit board and a front panel including a plurality of LEDs respectively corresponding to a plurality of provisioning options, said method comprising the steps of:

providing a provisioning pushbutton on said front panel;

selectively depressing said pushbutton for a set period of time to enter into a local provisioning mode;

sequentially scrolling through said plurality of LEDs at predetermined set intervals;

causing said plurality of LEDs to flash as each is sequentially scrolled to; and selectively pressing said pushbutton when each of said plurality of LEDs is flashing to enable said respective corresponding provisioning option, such that provisioning of said network interface unit is achieved solely by manipulating said pushbutton.

10. The method of claim 9, further comprising the step of automatically exiting said local provisioning mode after scrolling through said plurality of LEDs.

11. The method of claim 9, further comprising the step of utilizing a manual loopback button of said network interface unit to achieve the function of said provisioning pushbutton.

12. A network interface unit comprising:

a circuit board;

a front panel operatively connected to said circuit board;

a pushbutton on said front panel; and a plurality of LEDs on said front panel, said plurality of LEDs each corresponding to a specific NIU provision option;

wherein said pushbutton is manipulated to provision said network interface unit using visual clues from said plurality of LEDs, such that provisioning of said network interface unit is achieved solely by manipulating said pushbutton.

13. The network interface unit of claim 12, wherein said pushbutton is a dual functioning, manual loopback button.

14. A method for the local provisioning of a network interface unit comprising a circuit board having a front panel, said method comprising the steps of:

providing a pushbutton on said front panel;

providing a plurality of LEDs each corresponding to a specific NIU provision option;

manipulating said pushbutton to provision said network interface unit using visual clues for said plurality of LEDs, such that provisioning of said network interface unit is achieved solely by manipulating said pushbutton.

15. The method of claim 14, wherein said pushbutton is a dual functioning manual loopback button.

* * * * *